US000001842H

United States Statutory Invention Registration [19]

[11] Reg. Number: H1,842

Tontarski [45] Published: Mar. 7, 2000

[54] PASS THROUGH REPOSITIONABLE STAPLER-COMPILER SYSTEM WITH CLINCHER ALIGNMENT SYSTEM

[75] Inventor: Loren S. Tontarski, West Henrietta, N.Y.

[73] Assignee: Xerox Corporation, Stamford, Conn.

[21] Appl. No.: 09/005,390

[22] Filed: Jan. 9, 1998

[51] Int. Cl.[7] ..... B25C 5/00

[52] U.S. Cl. ..... 227/100; 227/107; 227/110; 227/155; 270/58.07; 270/58.08

[58] Field of Search ..... 270/58.01, 58.07, 270/58.08, 58.11, 58.12, 58.27; 399/407, 408, 410; 227/107, 110, 111, 138, 2, 119, 131, 155

[56] References Cited

U.S. PATENT DOCUMENTS

| | | | |
|---|---|---|---|
| 4,523,750 | 6/1985 | Hubler | 270/53 X |
| 5,029,831 | 7/1991 | Green | 270/53 |
| 5,382,011 | 1/1995 | Tani | 270/37 X |
| 5,460,314 | 10/1995 | Odagawa | 227/155 |
| 5,738,346 | 4/1998 | Ishida | 270/58.07 |
| 5,799,935 | 9/1998 | Yamanushi et al. | 270/58.08 |
| 5,826,158 | 11/1998 | Hirano et al. | 270/58.11 |
| 5,836,578 | 11/1998 | Hirano et al. | 270/58.11 |

*Primary Examiner*—Harold J. Tudor
*Attorney, Agent, or Firm*—Paul F. Morgan

[57] ABSTRACT

A compiling and stapling system with a compiling station for receiving and stacking sets of printed sheets inputted in a defined direction of movement for compiling and stapling them along a sheet edge transverse that movement direction with a two-part stapler providing ejection of the stapled sets out through that two-part stapler in the same direction of movement. This stapler has a staple driving unit separate from its staple clinching unit with an unobstructed spacing between them providing for unobstructed feeding of the stapled sets completely through the stapler in between the two separate units. An interlocking system such as a solenoid retractable alignment pin normally interlocks the two units in correct alignment for cooperate stapling and clinching of the collated set. The interlocking system then automatically unlocks the two units to provide an unobstructed set output path between the two units in that same direction of movement as the input path to the system. A recess in one unit may be adapted to receive an alignment pin therein by axial movement from the other unit for locking them together. That recess may also be adapted to receive the alignment pin therein by unidirectional lateral movement of one of the two units towards the other to provide a system for re-aligning the two units.

7 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PASS THROUGH REPOSITIONABLE STAPLER-COMPILER SYSTEM WITH CLINCHER ALIGNMENT SYSTEM

Disclosed in the embodiment herein is an improved unidirectional compiler/finishing system, in which the printed sheets outputted by a reproduction apparatus, such as a printer or copier, may move into the compiler, be finished, and then continue on in the same direction through the finishing system after finishing, by providing a stapling system which can staple the compiled sets of sheets in the compiler yet provide unobstructed feeding of the stapled sets out through the stapler, rather than requiring either reversed removal of the stapled sets from the compiler, or movement of the stapler all of the way to one side of the finisher out of the path of the stapled sheets being ejected, that is, without requiring movement of the stapler system out of the path of the ejected stapled set.

In particular, there is disclosed in the embodiment herein a set stapling system capable of stapling a compiled set of sheets in plural different positions along the leading edge of the set of sheets, that is, perpendicular to the direction of movement of the sheets, with a repositionable stapler unit providing accurate interlocked alignment of its stapler driving head portion on one side of the set of sheets to its mating staple clincher portion of the stapler unit on the other side of the set, yet which stapling system also provides complete separation between the stapling head and the clinching portion for ejection of the stapled set downstream through the stapler system between the separated stapler driving head portion and staple clincher portion.

It will be appreciated that the systems and mechanisms disclosed herein are merely exemplary, and that others may be employed to achieve the disclosed function and result, utilizing the same basic concepts.

While it has been heretofore known to provide unidirectional compiler/stapler finishing systems, such as the Xerox Corporation "5100"™ copier (such as shown in Xerox Corp. U.S. Pat. No. 5,029,831 issued Jul. 9, 1991 to Frederick A. Green) and the Xerox Corporation "1090"™ copier; or the system shown in FIG. 2 of Xerox Corp. U.S. Pat. No. 5,289,251 issued Feb. 22 1994 to Barry P. Mandel, et al; or U.S. Pat. No. 5,443,249 issued Aug. 22, 1995 to Charles D. Rizolo, et al; in which unidirectional systems the stapled set ejects from the opposite side of the compiler from the entering sheets; such systems have heretofore been restricted to corner or lateral edge stapling, or require a time delay and increase in skipped (non-print) pitches, and a wider finisher unit, to allow the stapler unit to be moved to one side of the paper path, out of the way of the stapled set to be ejected. Otherwise, the normal hinge connection between the stapler head and the stapler clincher, defining the set stapling jaws of the stapler, would directly obstruct any attempted movement of the stapled set through the stapler. Thus, heretofore it was not considered possible to eject the stapled set out through the stapler or staplers. Rather, the stapler was moved out of the way, and/or the stapled set had to be removed backwards, away from the repositionable stapler, in a non-unidirectional (bi-directional) compiler/stapler system. E.g., Xerox Corp. U.S. Pat. No. 5,639,078 issued Jun. 17, 1997 and other art cited therein. Such bi-directional systems have several disadvantages. They include requiring each the incoming sheets from the printer or other output to be reversed in motion direction in order to register against the registration edge. The registration edge is the wall or fingers against which the set of sheets needs to be aligned before stapling (in order to have a correctly aligned or squared set, rather than skewed sheets). Also, typically, such bi-directional compiler/finisher systems require the stapled set to then be forcibly fed to be ejected "uphill", away from a downhill registration edge, up out of a compiling tray which is sloping in the opposite direction for downhill compiling registration, rather than being able to much more easily slide downhill, with or without feeder assistance.

Note that it is desirable to feed sheets through a reproduction apparatus sideways or long edge first, so as to increase the productivity, or number of sheets per minute being printed, with a lower processing velocity as compared to feeding the sheets short edge first or lengthwise. It is also normally desirable for booklet making or other plural page document printing to be able to staple such related sheets together along their long edge, since printed sheets are normally printed and read in portrait rather than landscape mode. Thus, the normal desired registration and stapling edge (except for small, slower speed, printers that feed short edge first) (and to avoid a sheet output ninety degree rotation) is transverse the sheet output path. Hence, heretofore, the stapler or staplers were normally obstructing a unidirectional sheet output path, as discussed above and below.

Typically, a robust hinge is required between the stapler and clincher because of the stapling forces and to ensure meeting the rather close tolerance requirements in the alignment of the stapler head with the clincher mechanism, particularly with the use of an active clincher system. Active clincher systems bend over more neatly and flatly the ends of the staple legs that protrude from one side (usually the bottom) of the stack or set of sheets after the staple has been driven through the stack by the stapler head from the other side (usually the top) of the stack. Staplers with active clinchers are well-known and need not be described in detail herein. Some examples are disclosed in Xerox Corporation U.S. Pat. Nos. 4,358,040; 4,378,085; and 4,546,910.

In the disclosed stapler system embodiment, the stapler head unit and the clincher unit are independent and spaced apart, and there is a removable interlocking system between the stapler head unit and the clincher unit, rather than the conventional fixed hinge connection. These two units are locked together for integral movement repositioning of the stapler system when the stapler must move from one stapling position to another along the edge of the set being stapled. This inter-unit locking may also be maintained during the stapling operation. However, this interlocking system normally locking the two units together automatically unlocks to open an unobstructed set ejection space between, and passing through, the stapling unit and the clincher unit for the ejection of the stapled set therebetween. Then the two units may again be automatically locked together by the interlocking system, which may also provide fine realignment of one unit relative to the other.

Further disclosed as an additional, optional feature, is an automatic realignment system in which, if the stapler and clincher unit become misaligned, alignment can be reestablished, and to allow re-establishment of the automatic interlocking system. That is, the interlocking system disclosed herein also is adapted to provide an exemplary system for automatic realignment in the event of an inadvertent misalignment of the stapler head and clincher.

Furthermore, as also disclosed in the embodiment herein, only the stapler unit need be driven, and the clincher unit, even though independent, can be repositioned automatically with the same repositioning system provided for the stapler head by the automatic interlocking of the two units during movement of the stapler head.

It is believed that the Kodak "1575"™ copier finisher has a repositionable upper stapler head or upper stapler section and plural fixed position clinchers to allow unidirectional or pass-through stapling. However, this requires the additional costs and manufacturing alignments of the plural clinchers. That would be especially burdensome if these were active clincher systems rather than typical passive anvil clinchers. There is also the increased possibility that other misalignment problems with the stapler unit could cause the stapler unit to be misaligned with one or more of these fixed position clinchers.

It will be appreciated that, as with other unidirectional compiler finishers, a registration gate with at least two spaced registration fingers will conventionally be provided at the downstream edge of the compiling area of the compiler unit, transverse the paper path, to align the downstream edge of the incoming sheets prior to stapling and set ejection. These registration fingers may retract in a known manner out of the ejection path of the set in such a unidirectional system, as is well known per se and need not further be described in detail herein.

Likewise, the particular mechanism for moving a stapler along the stapling edge of a compiled stack, typically from the front to the back of the machine, perpendicular to the paper path, for selection of the desired plural stapling positions, is shown in the above-cited and other patents and thus need not be described in detail herein.

A specific feature of the specific embodiment disclosed herein is to provide a printed sheets compiling and stapling system having a compiling station for receiving and stacking therein plural printed sheets from a sheet printing apparatus which is outputting said printed sheets in a sheet output path with a defined direction of movement, said compiling and stapling system having a stapling system for stapling together, along a defined sheet edge, and then outputting, stapled sets of said plural printed sheets received and stacked in said compiling station, said stapling system providing clinching of a staple on one side of a sheet set driven through said sheet set from the other side of said sheet set, the improvement comprising at least one two-part stapler positionable transverse said sheet output path for stapling along said sheet edge, said two-part stapler providing for outputting of said stapled sets from said compiling station through said two-part stapler in said same defined direction of movement, said two-part stapler having a staple driving unit and a separate staple clinching unit which is separated from said staple driving unit by an unobstructed spacing distance sufficient to allow unobstructed feeding of said stapled sets completely through said two-part stapler in between said staple driving unit and said staple clinching unit in said defined direction of movement, and an interlocking system for interlocking said separate staple clinching unit to said staple driving unit during said stapling in a properly aligned superposed position for clinching a staple on one side of a sheet set driven through said sheet set from the other side of said sheet set by said staple driving unit, said interlocking system automatically unlocking said staple clinching unit from said staple driving unit to provide said unobstructed spacing between said staple clinching unit and said staple driving unit during said outputting of said stapled sets from said compiling station through said two-part stapler.

Further specific features disclosed herein, individually or in combination, include those wherein said interlocking system comprises a retractable alignment member system normally extending in between and interlocking said staple clinching unit to said staple driving unit, and a retraction system for automatically retracting said retractable alignment member from in between said staple clinching unit and said staple driving unit during said outputting of said stapled sets from said compiling station through said two-part stapler; and/or wherein said interlocking system comprises at least one retractable alignment pin normally extending in between and interlocking said staple clinching unit to said staple driving unit, and a solenoid retraction system for automatically retracting said retractable alignment pin from in between said staple clinching unit and said staple driving unit during said outputting of said stapled sets from said compiling station through said two-part stapler; and/or wherein said interlocking system further comprises a re-alignment system for realigning said staple clinching unit to said staple driving unit into said properly aligned superposed position when said staple clinching unit is unlocked from said staple driving unit; and/or wherein said interlocking system further comprises a mating recess in one of said staple clinching unit or said staple driving unit into which said retractable alignment pin normally extends to normally interlock said staple clinching unit to said staple driving unit; and/or wherein said mating recess is adapted to receive said retractable alignment pin therein by axial movement of said alignment pin into said recess; and/or wherein said mating recess is also adapted to receive said retractable alignment pin therein by unidirectional lateral movement of said alignment pin into said recess to provide a re-alignment system for re-aligning said staple clinching unit to said staple driving unit into said properly aligned superposed position when said staple clinching unit is unlocked from said staple driving unit.

The disclosed system may be operated and controlled by appropriate operation of conventional control systems. It is well known and preferable to program and execute paper handling and other control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs.

It is well known that the control of copy sheet handling systems may be accomplished by conventionally actuating them with signals from a microprocessor controller directly or indirectly in response to simple programmed commands, and/or from selected actuation or non-actuation of conventional switch inputs. The resultant controller signals may conventionally actuate various conventional electrical solenoid or cam-controlled sheet controlling motors or clutches, or other components, in programmed steps or sequences. Conventional sheet path sensors or switches connected to the controller may be utilized for sensing, counting, and timing the positions of sheets in the sheet paths of the reproduction apparatus, and thereby also controlling the operation of sheet feeders, staplers, set ejectors, etc., as is well known in the art.

In the description herein the term "sheet" refers to a usually flimsy physical sheet of paper, plastic, or other suitable physical substrate for images, whether precut or web fed. A "copy sheet" may be abbreviated as a "copy", or called a "hardcopy". A "job" or "set" is normally a set of related sheets, usually a collated copy set copied from a set of original document sheets or electronic document page images, from a particular user, or otherwise related. As used in this patent, the term "stapler" is intended to broadly encompass both staplers and stitchers. The difference is primarily that staplers are provided with a supply of precut wire, whereas stitchers are provided with a continuous wire supply and cut to the desired length to suit the set thickness within the unit.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation described in the example below, and the claims. Thus, the present invention will be better understood from this description of a specific embodiment, including the drawing figures (approximately to scale) wherein:

Figure 1:
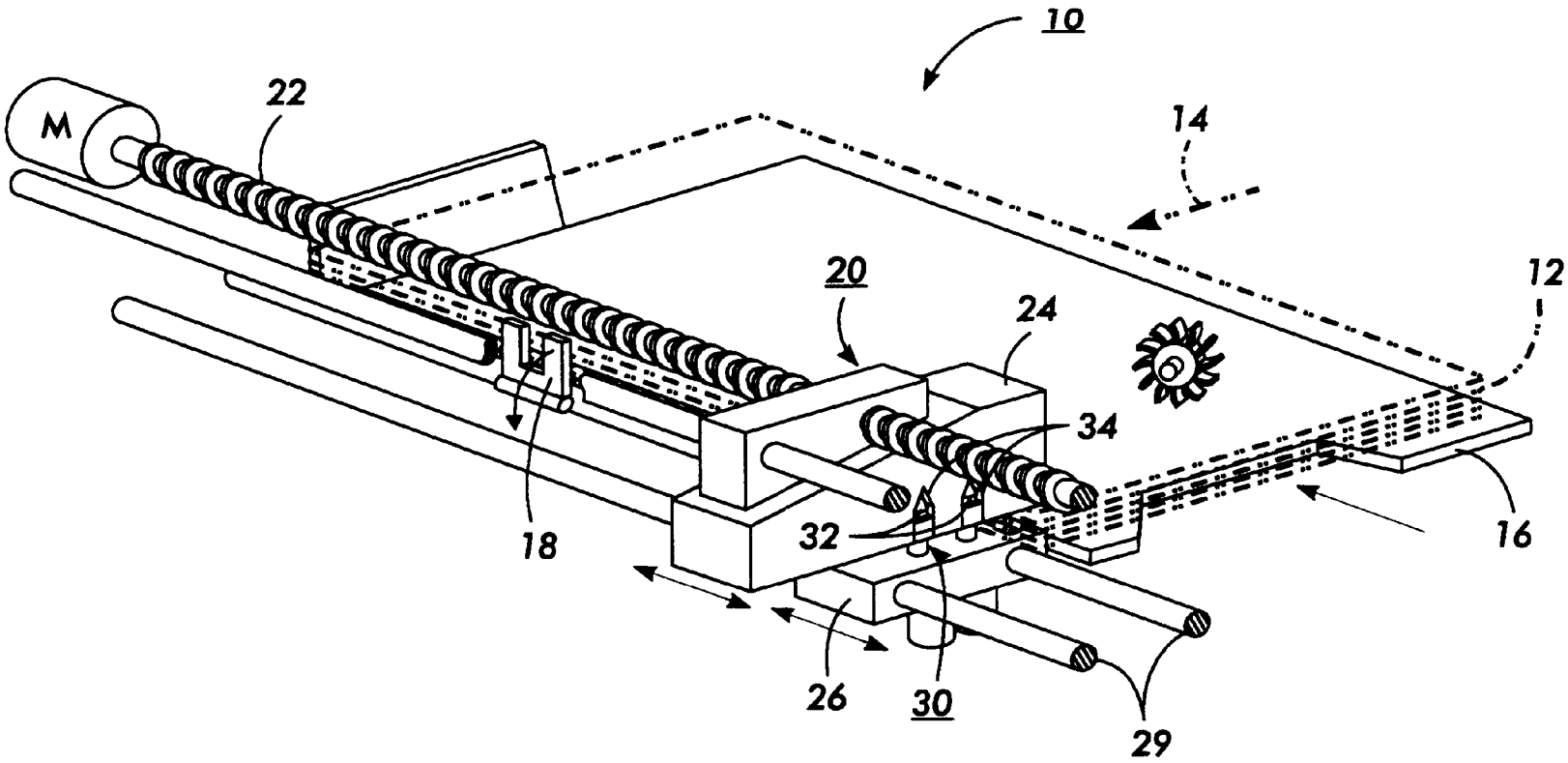
FIG. 1 is a schematic perspective view of a unidirectional compiler/stapler finishing system with a stapled set pass-through system, with a stapler unit to clincher unit unlockable interlocking system, with the sheet movement direction indicated by the phantom arrow, as one example thereof.
Figure 2:
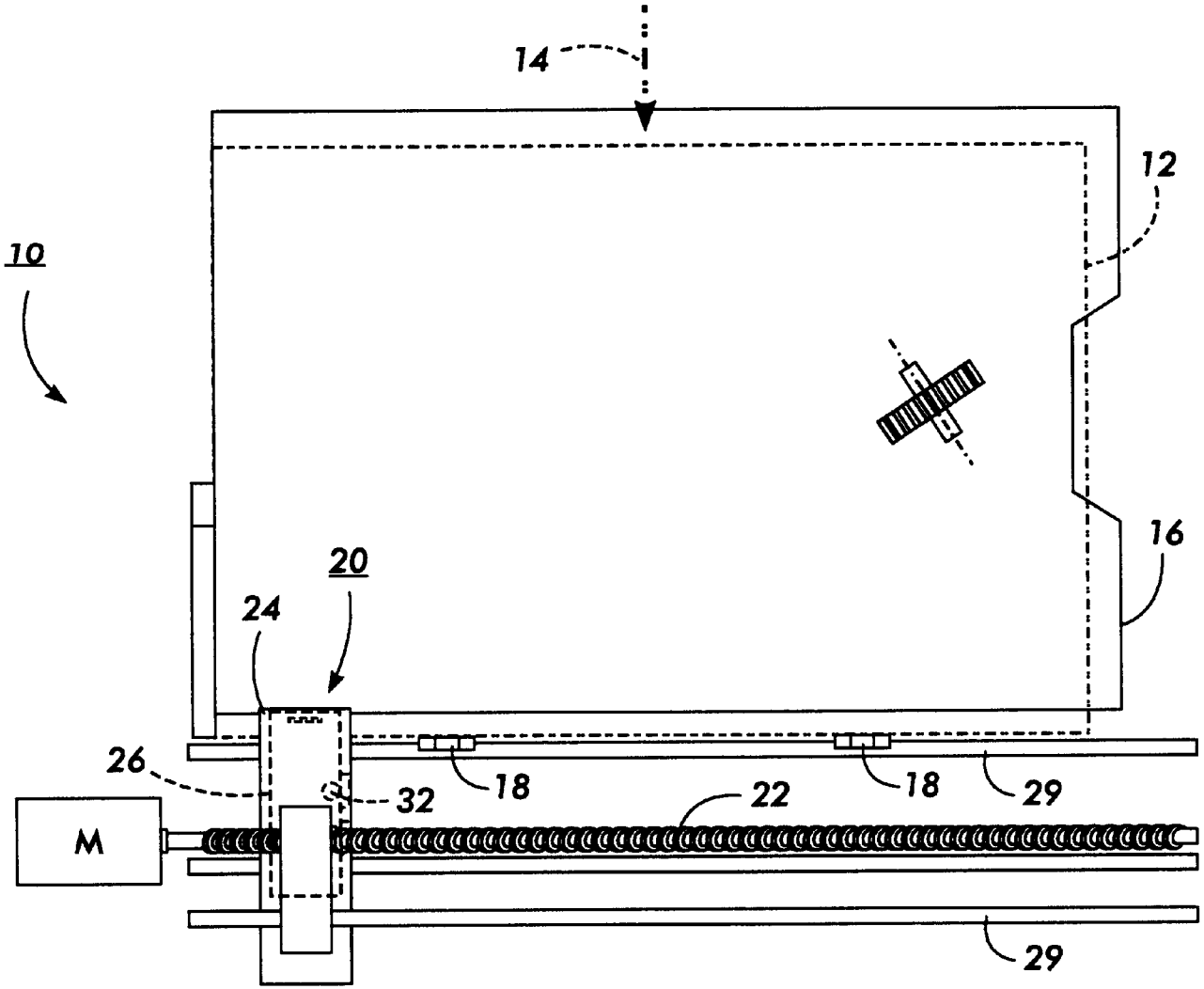
FIG. 2 is a top view of the exemplary unidirectional stapled set pass-through compiling and stapling system of FIG. 1.
Figure 3:
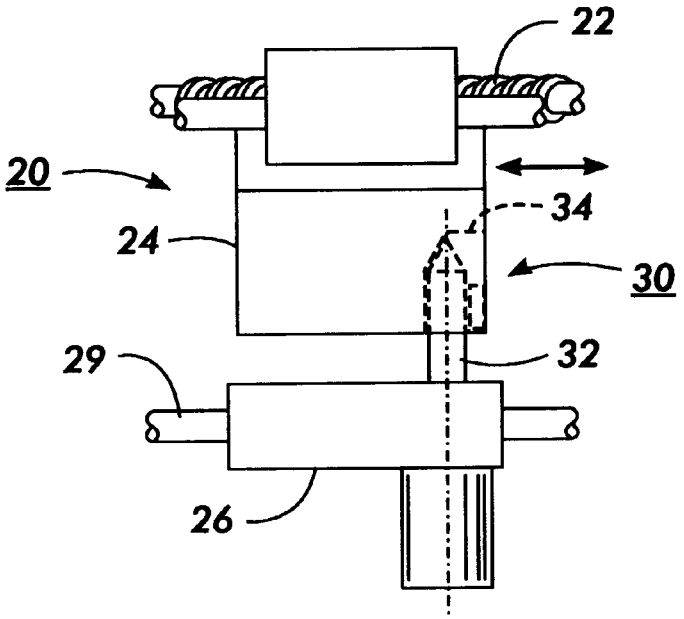
FIG. 3 is a partial, enlarged, downstream or end view, of the exemplary stapler unit and clincher unit and their interlocking system per se, comprising in this example a spaced pair of retractable alignment pins.
Figure 4:
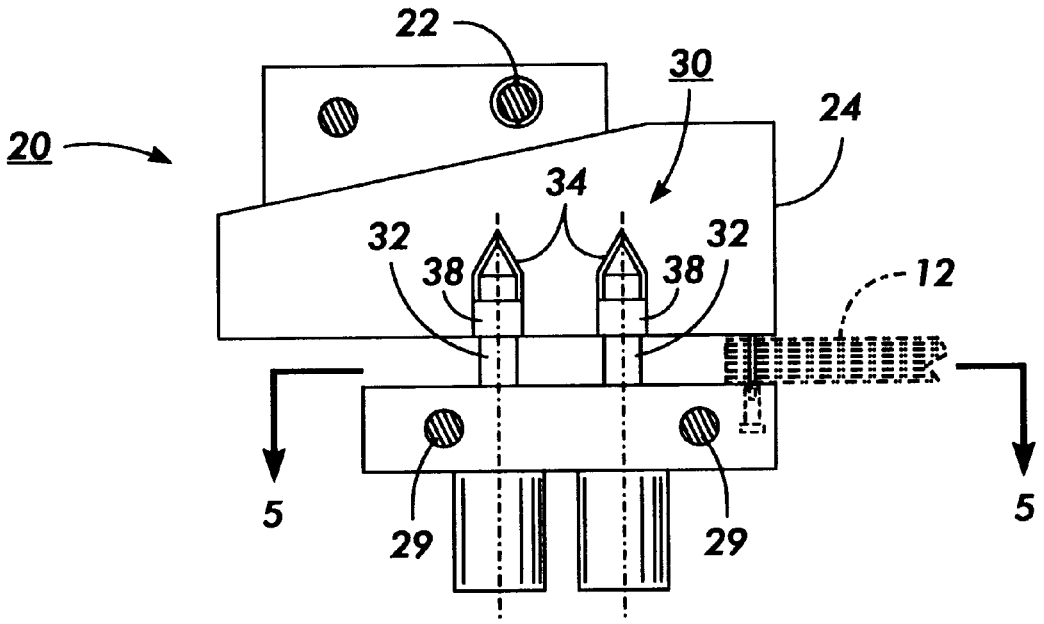
FIG. 4 is a rear view of the exemplary stapler unit, clincher unit and interlocking system per se of FIG. 3, shown in its interlocked mode or position with a set being stapled.
Figure 5:
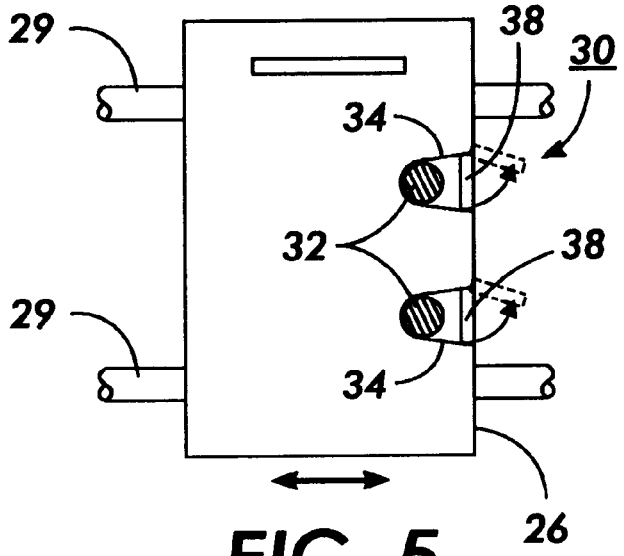
Figure 6:
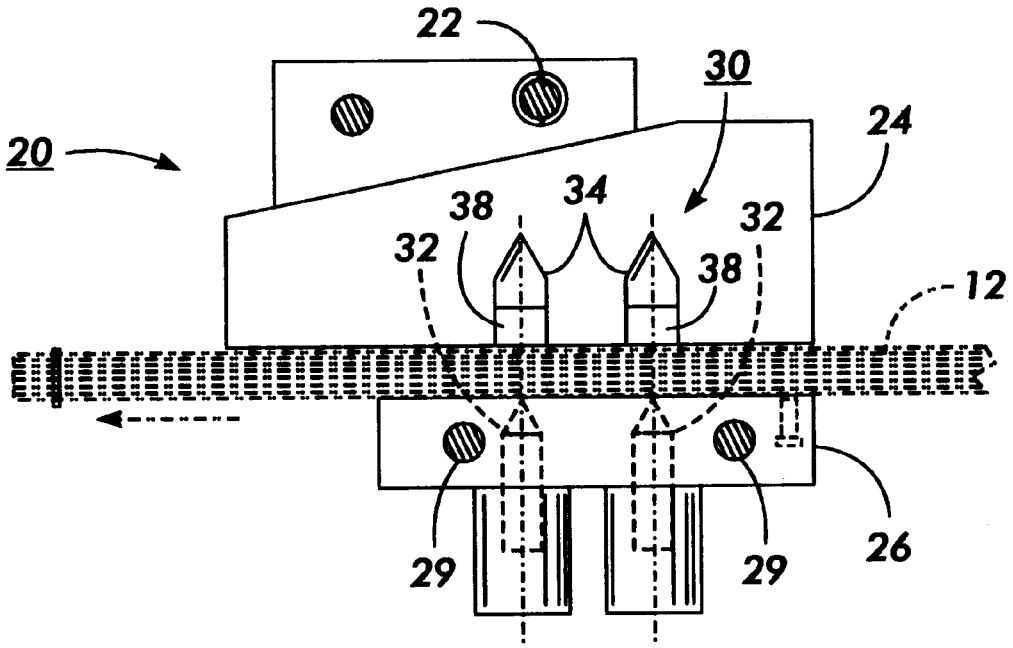

FIG. 5 is a top view of the system of FIGS. 3 and 4, also showing an exemplary realignment system by which the exemplary interlocking system can be automatically re-aligned by movement of the stapler unit to one side of the paper path in the event that the stapler unit and the independent clincher unit become substantially miss-aligned during a time period in which the interlocking system therebetween is disengaged; and FIG. 6 is a rear view, like FIG. 4, but shown with the interlocking system in its unlocked mode or position with the previously stapled set of sheets being ejected out through the stapling system in between the unlocked stapler unit and clincher unit in the same direction as it entered, as shown by the set's phantom movement arrow.

As shown schematically in the Figures in this example, a unidirectional compiler/stapler finishing unit 10 is provided for compiling printed sheets 12 fed thereinto from an associated reproduction system 14 such as a conventional xerographic printer or copier. The sheets 12 are conventionally sequentially fed into a compiler tray 16 having retractable registration fingers 18 against which the sheets stack as a set, preferably extending partially into the throat of a stapling system 20. The stapling system 20 is movable transversely, as described above, to selected stapling positions along the downstream edge of the registered sheet stack. Typical desired stapling positions can be in one corner of the stack, or in two or three evenly spaced positions along the edge margin of a stack. Here, the stapling system 20 repositioning is illustrated by an exemplary rotated screw shaft 22 rotatably driven by a reversible motor "M" at one end thereof, as in the above-cited U.S. Pat. No. 5,443,249. It will be appreciated that this is merely exemplary and that cables and other drive systems can be provided for repositioning the stapling system 20.

In this example, the stapling system 20 comprises two independent, independently mounted, units; a stapler head unit 24, and a separate staple clincher unit 26. These units 24, 26 are mounted respectively above and below the sheet set being stapled, and spaced apart sufficiently to allow a stapled set of, e.g., up to 50 or 100 sheets, to pass therebetween. The upper stapler unit 24 may conventionally include a drive motor for driving the staples down through the set into the clincher 26. The stapler head unit 24 or the clincher unit 26 may also be moveable towards one another for clamping the set therebetween before and during stapling, as is well known. That is, vertical movement during stapling is conventionally provided between the stapler head 24 and the clincher 26. After all of the stapling and staple clinching for that sheet set is accomplished, the two units 24, 26 are automatically held apart as shown to allow space for the ejection of the stapled set therebetween. The clincher unit 26 here is, as described above, preferably an active clincher, with movable clincher legs for conventionally folding over the legs of the staples extending through the set after the staple is driven in from the other side of the set from the stapler unit 24.

It is important to note that the clincher unit 26 here is mounted on its own independent lateral movement system for movement in the same direction as the stapler head unit 24, but spaced therefrom. Here, this is provided by a pair of slide rails 29 on which the clincher unit 26 is freely laterally slideable. This clincher unit 26 does not require its own lateral drive system, since that is provided here by the an interlocking system 30 movably locking the stapler head unit 24 to the clincher unit 26 for common movement and alignment maintenance therebetween, except during set ejection out between the two units 24, 26. That is, both halves 24, 26 of the stapling system 20 are on their own lateral rail mounting systems here, only one half need be driven, and the opposing half becomes a follower unit when the interlocking system 30 is engaged, as described.

As shown, the interlocking system 30 here may comprise a spaced pair of alignment pins 32 with tapered ends for aligning, reciprocally vertically movable between the clincher unit and the stapler unit. In this example, they are mounted in, and move with, the clincher unit 26. However, it will be appreciated that these pins or other interlocking devices could also be mounted in and move with the stapler head unit 24, retracting into the stapler head 24 for set ejection rather than into the clincher unit 26, as shown here. The retraction of the pins 32 is illustrated by the arrows shown thereon. Preferably, these pins 32 are spring loaded to normally extend between the clincher unit 26 and the stapler head unit 24 into correspondingly dimensioned mating apertures 34, which causes the two units to be accurately aligned for stapling. Yet, when the pins 32 are retracted, they are completely out of the path of the set being ejected from the compiler tray 16. Since there is no conventional hinge or other connection between the stapler head unit 24 and the clincher unit 26, the retraction of the pins 32 provides a completely unobstructed access of the set therebetween and therefore there is no need to have to move the stapling unit 20 to one side of the paper path for set ejection. That also saves time, which is also important to avoid having to skip printing pitches for each set ejection. With the disclosed system, the set may be ejected immediately after the last staple is stapled into the set, regardless of the position of the stapling unit. The reciprocal retraction of the interlocking pins 32 may be initiated as soon as the clincher unit 26 is operated to clinch the last staple legs.

Turning now to FIGS. 4 and 5 in particular, there is shown an example of an additional, realignment, system, provided in case a power failure, a stapling jam, or other difficulty causes the stapler head unit 24 to become substantially misaligned from the clincher unit 26 such that the interlocking system 30 can no longer re-engage between the two units after the stapled set is ejected out therebetween by axial movement of the alignment pins. In that event, (and also on startup, and periodically for alignment assurance, if desired) the stapler head unit 24 may simply be driven transversely all the way to one side of the paper path. In this example, the interlock mating apertures 34 in the stapler head unit 24 have lateral access openings provided by lateral entrance slots thereto in one side of the stapler head unit 24. The alignment pins 32 in the clincher unit 26 will always be on that one side of the stapler head 24 here. Thus, by driving the stapler head unit 24 in that same direction, at some point along the lateral movement path of the stapler head 24 the clincher alignment pins 32 will enter these lateral slots and go into their alignment position in the apertures 34. Thus, by this homing movement, the latching or interlocking mechanism 30 may be reengaged to reestablish a previously lost registration between the two stapler units 24 and 26.

An additional locking feature shown here in FIGS. 4 and 5 is a side latching mechanism 38 which may be a simple latching member as shown, rotated or lifted out of the way during such re-homing movement and then rotated or lifted into a locking position, as shown, to laterally lock the outsides of the pins 32 into their apertures 34 at the inside of the lateral slots. It will be appreciated that a snap-in spring or other passive latching system could be utilized for this side or lateral latching of the alignment pins 32.

While the embodiment disclosed herein is preferred, it will be appreciated from this teaching that various alternatives, modifications, variations or improvements therein may be made by those skilled in the art, which are intended to be encompassed by the following claims.

What is claimed is:

1. The improvement in a printed sheets compiling and stapling system having a compiling station for receiving and stacking therein plural printed sheets from a sheet printing apparatus which is outputting said printed sheets in a sheet output path with a defined direction of movement, said compiling and stapling system having a stapling system for stapling together, along a defined sheet edge, and then outputting, stapled sets of said plural printed sheets received and stacked in said compiling station, said stapling system providing clinching of a staple on one side of a sheet set driven through said sheet set from the other side of said sheet set, the improvement in said compiling and stapling system comprising;

at least one two-part stapler positionable transverse said sheet output path for stapling along said sheet edge, said two-part stapler providing for outputting of said stapled sets from said compiling station through said two-part stapler in said same defined direction of movement, said two-part stapler having a staple driving unit and a separate staple clinching unit which is separated from said staple driving unit by an unobstructed spacing distance sufficient to allow unobstructed feeding of said stapled sets completely through said two-part stapler in between said staple driving unit and said staple clinching unit in said defined direction of movement, and an interlocking system for interlocking said separate staple clinching unit to said staple driving unit during said stapling in a properly aligned superposed position for clinching a staple on one side of a sheet set driven through said sheet set from the other side of said sheet set by said staple driving unit, said interlocking system automatically unlocking said staple clinching unit from said staple driving unit to provide said unobstructed spacing between said staple clinching unit and said staple driving unit during said outputting of said stapled sets from said compiling station through said two-part stapler.

2. The printed sheets compiling and stapling system of claim 1, wherein said interlocking system comprises a retractable alignment member system normally extending in between and interlocking said staple clinching unit to said staple driving unit, and a retraction system for automatically retracting said retractable alignment member from in between said staple clinching unit and said staple driving unit during said outputting of said stapled sets from said compiling station through said two-part stapler.

3. The printed sheets compiling and stapling system of claim 1, wherein said interlocking system comprises at least one retractable alignment pin normally extending in between and interlocking said staple clinching unit to said staple driving unit, and a solenoid retraction system for automatically retracting said retractable alignment pin from in between said staple clinching unit and said staple driving unit during said outputting of said stapled sets from said compiling station through said two-part stapler.

4. The printed sheets compiling and stapling system of claim 1, wherein said interlocking system further comprises a re-alignment system for re-aligning said staple clinching unit to said staple driving unit into said properly aligned superposed position when said staple clinching unit is unlocked from said staple driving unit.

5. The printed sheets compiling and stapling system of claim 3, wherein said interlocking system further comprises a mating recess in one of said staple clinching unit or said staple driving unit into which said retractable alignment pin normally extends to normally interlock said staple clinching unit to said staple driving unit.

6. The printed sheets compiling and stapling system of claim 5, wherein said mating recess is adapted to receive said retractable alignment pin therein by axial movement of said alignment pin into said recess.

7. The printed sheets compiling and stapling system of claim 6, wherein said mating recess is also adapted to receive said retractable alignment pin therein by unidirectional lateral movement of said alignment pin into said recess to provide a re-alignment system for re-aligning said staple clinching unit to said staple driving unit into said properly aligned superposed position when said staple clinching unit is unlocked from said staple driving unit.

* * * * *